Sept. 18, 1962     B. E. BUDAHN     3,054,445
METHOD FOR SPRAY DRYING FLOWABLE LIQUID-CONTAINING MATERIALS
Original Filed Feb. 7, 1956     2 Sheets-Sheet 1
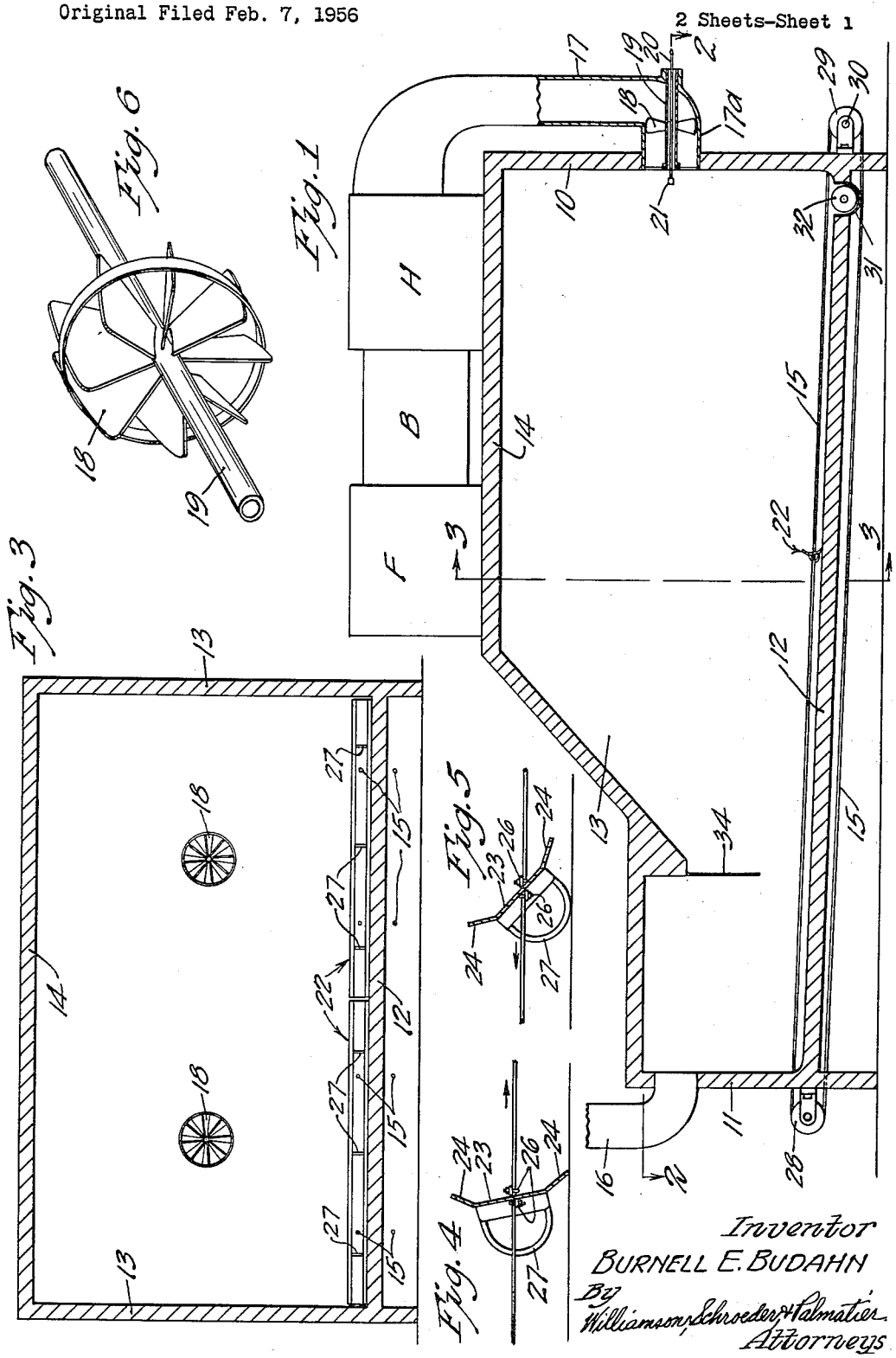
Inventor
BURNELL E. BUDAHN
By Williamson, Schroeder & Palmatier
Attorneys

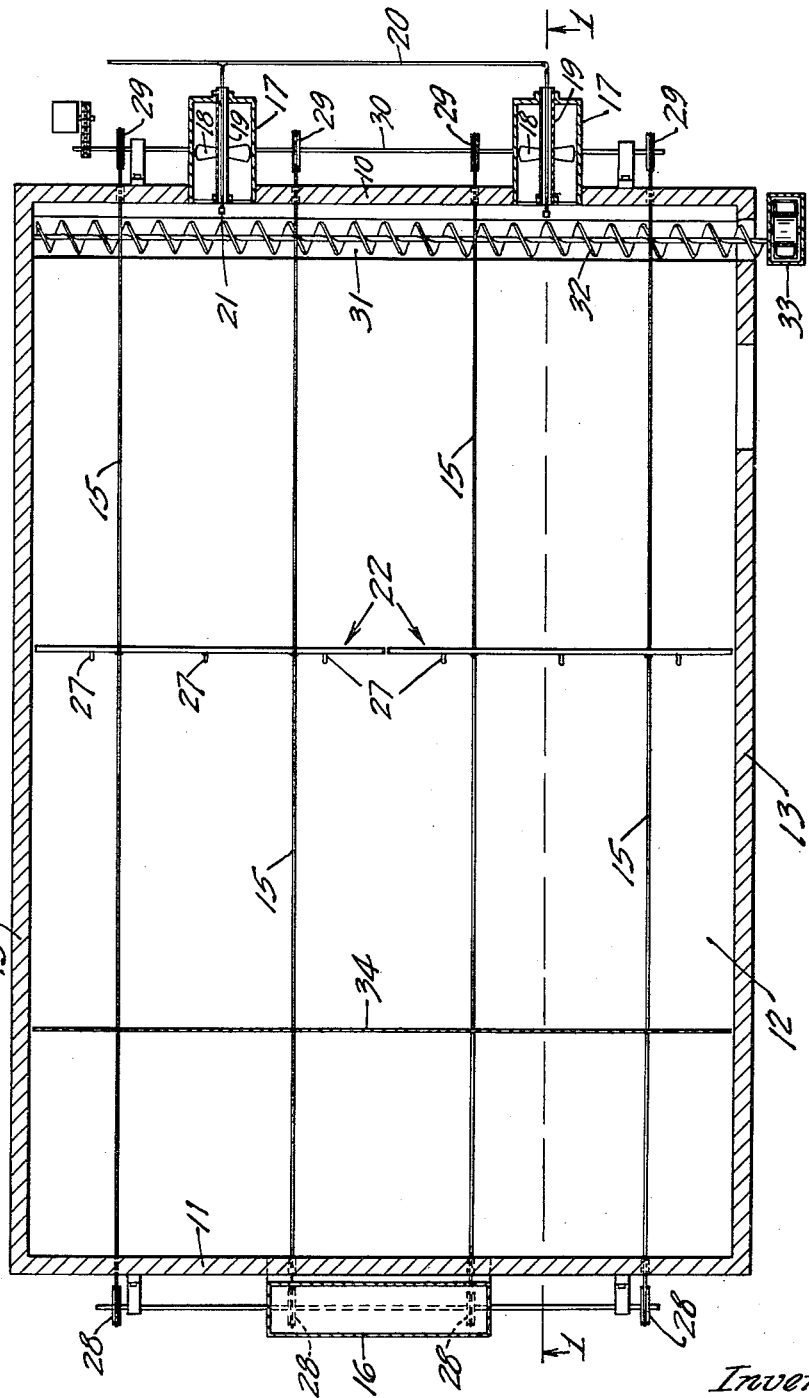

United States Patent Office 3,054,445
Patented Sept. 18, 1962

3,054,445
METHOD FOR SPRAY DRYING FLOWABLE
LIQUID-CONTAINING MATERIALS
Burnell E. Budahn, Bongards, Minn.
Original application Feb. 7, 1956, Ser. No. 563,873. Divided and this application June 23, 1958, Ser. No. 743,749
7 Claims. (Cl. 159—48)

This invention relates to high capacity apparatus for spray-drying material supplied in liquid, semi-liquid, emulsion and solid-liquid mixture state.

This is a divisional application of my continuation-in-part application entitled Apparatus and Method for Spray Drying Flowable Liquid-Containing Materials, Serial Number 563,873, filed February 7, 1956, now Patent No. 2,936,029, which in turn is a continuation-in-part application of my prior application for patent Serial Number 159,908, filed by me May 4, 1950, now abandoned, and entitled Apparatus for Spray-Drying Flowable Liquid-Containing Materials.

My invention is well adapted for manifold uses in spray-drying in the production of fine, granulated or powdered material, but is particularly well adapted for the production of milk and buttermilk powders including the production of non-hygroscopic whey powders containing the stable or mono-hydrate milk sugars. All previously known methods of forming a dried whey product results in the production of a dried whey powder which is unstable and will revert back to the hygroscopic form over a period of time. My invention eliminates this undesirable characteristic.

It is an object of my invention to provide simple and highly efficient apparatus for spray-drying materials of the class described, to produce finely divided granular or powdered products which may be controlled within close working limits and which will most effectively spray, air treat, dry and collect the material treated and the resultant product respectively.

Another object is to provide a novel method of spray drying whey to yield a stable non-hygroscopic whey powder.

A further object is the provision of apparatus of the class described wherein a venturi action and high turbulence is produced in the spraying and dispersion of the supplied material with attendant elimination of "dead spots" in the spraying chamber and the elimination of all tendency of the powdered product to back flow through the air supply ducts.

Another object is to provide spray-drying apparatus particularly adapted for high capacity commercial use wherein after spraying, air treating and dispersion at optimum conditions, the powder formed is permitted to accumulate and stand undisturbed for predetermined, desirable intervals and then is removed at regular intervals from the bottom or lower portion of the chamber A more specific object is the provision of spray-drying apparatus of the class described wherein the nozzles or other discharge of the supplied mixture containing liquid, are enveloped by a relatively large, rapid vortex of hot air or other gas surrounding the discharge and dispersing and treating the sprayed product with optimum efficiency.

A still further object is the provision of powdered product-deflection and collection which may be regulated in accordance to the specific requirements and which closely cooperate with the product-removal means to obtain highly efficient results and control.

These and other objects and advantages of my invention will more fully appear from the following description made in connection with the accompanying drawings wherein like reference characters refer to similar parts throughout the several views and in which:

FIG. 1 is a vertical section taken longitudinally through an embodiment of my spray-drying apparatus apex along the line 1—1 of FIG. 2;

FIG. 2 is a horizontal section taken along the line 2—2 of FIG. 1;

FIG. 3 is a vertical cross section taken along the line 3—3 of FIG. 1 looking toward the spray discharge nozzle;

FIG. 4 is a detail end elevation on a larger scale showing my novel material-conveying element in operative material-moving position;

FIG. 5 is a similar view showing the conveying element in a feathered or return position; and FIG. 6 is a detail perspective view showing the stationary mechanism for imparting a rapid vortex to the discharged hot air.

In the form of the invention illustrated, a generally horizontally extending drying chamber is utilized, comprising as shown, a vertical front wall 10, a diminished rear wall 11, a flat bottom wall 12 declined slightly from the rear to the front end of the enclosure and side walls 13 and a top wall 14. The bottom wall 12 is preferably disposed some distance above the floor of the building in which my apparatus is mounted, to facilitate accommodation of endless conveyor operating chains or flexible elements 15. The walls of the drying enclosure or chamber are preferably constructed from concrete or suitable structural material or composition having good heat insulation properties. The roof or ceiling of the chamber, as shown, is substantially horizontal throughout the portion thereof above the initial spraying action and treatment of the material and then angles downwardly toward the rear wall 11 of the chamber to diminish the height of the chamber where the spray dried material is mainly collected and where the air used for drying is exhausted from the chamber through suitable means such as a wide air exhaust duct 16.

In the front or intake wall 10 of the enclosure or chamber, I provide one or more spraying uints, two thereof being shown in the embodiment illustrated. Each of said units comprises as shown, a relatively large cylindrical air exhaust sleeve 17a connected as shown as an integral part of an elbow duct 17 which in the drawings, extends downwardly from the delivery end of a heating chamber H which has mounted therein (not shown) suitable heating coils. The duct 17 from its communication with the heating chamber H tapers downwardly into communication with its lower or discharge extremity 17a which is disposed approximately 5.75 feet above the bottom wall 12.

Mounted in fixed relation to the hot air discharge sleeve 17a is a fan-like air turbinating device 18 consisting in a plurality of fixed vanes or blades preferably of variable pitch construction, disposed radially of the axis of the discharge sleeve 17a and centrally recessed and if desired, secured at their inner ends to a tube 19 which is fixedly, but detachably mounted in the lower portion of duct 17 and which extends axially of the discharge sleeve 17a. Within tube 19 is shown a material-supply conduit 20 of relatively small diameter, extending axially of tube 19 and having at its extremity, as shown, within the front of the spray chamber, a discharge nozzle 21 of a type preferably to direct a conical spray of finely divided particles axially of the nozzle. The two spray units comprising the cooperating parts described as shown in the form illustrated, are mounted medially in the front wall of the enclosure defining the drying chamber in widely spaced relation and are directed substantially horizontally.

Hot air moved at high velocity is supplied to the upper enlarged end of the air duct 17 from the heater chamber or housing H by means of a powerful blower (not shown) enclosed within a blower casing B, the discharge of which is in communication with the rear end of the heating chamber H. I prefer to provide a suitable filter housing F at the rear of the blower having at its forward end communication with the blower housing and having suitable air intakes (not shown) at its rear end. For convenience, the filter unit, the blower housing and the heating chamber in the form disclosed, are supported upon the top of my drying and spraying chamber.

Extending transversely of the drying chamber is a pair of drag elements indicated generally as 22 and comprised of an elongated plate member 23, the upper and lower edges of which are bent inwardly to form dry product engaging flanges 24. The drag elements 22 are secured to a plurality of elongated flexible members 15 by a pair of cable clamps 26 which are secured to the flexible elements or cables 25 immediately fore and aft of the plate member 23 to secure the same thereto and to permit the same to rock backwardly and forwardly thereon. Secured to the back of the plate 23 are a plurality of sliding elements or rockers 27 which engage the bottom 12 of the drying chamber when the entire drag element 22 is moved rearwardly. As best shown in FIG. 1, the cables 15 extend around a roller 28 which is secured to the end of the drying chamber adjacent the exhaust duct 16. These cables 15 also extend around a drive pulley 29 which is mounted on a motor driven shaft 30. The motor which provides the power for driving the shaft 30 and the drive pulleys 29 is shown in FIG. 2 and is of the type which will cause the cable elements 15 to move forwardly toward the drive pulley 29 a distance equal to the length of the chamber and which will then cause the cable to move rearwardly to its original position and stop for a predetermined interval before moving again. I have found that it is preferable to space the periods during which the cable elements are moved to about five minute intervals. It is imperative that the material deposited on the bottom wall 12 be permitted to remain in an undisturbed state at least one minute. I have found that if this is done, the dried particles will stabilize and will not revert to hygroscopic form upon standing. In the form shown herein, I utilize a 66–68 second cycle for the discharging operation (about 33–34 seconds required for the movement in each direction) and I repeat the operation about every five minutes.

As best shown in FIG. 1 the bottom wall 12 of the drying chamber is provided with a transverse opening adjacent its lower end in which is mounted a trough 31. Mounted in this opening for rotary movement is an auger type conveyor 32 which is driven by a motor (not shown) and which is adapted to convey material to an elevator 33 disposed at one of its ends.

Depending from the top wall 14 of the drying chamber is a vertically adjustable restricting element or curtain 34. This curtain is preferably of stainless steel or some other material which will present a very smooth non-adhering surface to the dried particles of material with which it will come in contact. The interior surfaces of the drying chamber are also preferably formed of a material which will present a smooth non-adhering surface to the dried particles of material.

In operation, air is drawn from the outside through the filter housing F by the blowers mounted in the blower housing B and forced thereby over the heating coils in the heating chamber H and into the restricted elbow duct 17. From there the hot air is forced through the exhaust sleeve 17a and through the air turbinating device 18 and expelled at a very high velocity into the drying chamber. It has been found that a volume in the vicinity of 8000 cu. ft. per minute discharged into the drying chamber in this manner is preferable. As this hot dry air is forced through the air turbinating device 18 a vortex of highly turbulent hot air is produced which rushes inwardly into the chamber immediately beyond the inner end of the tube 19 and the discharge nozzle 21. This tube 19 as best shown in FIG. 1 communicates with the outside air. The natural result of driving this high velocity vortex of the hot air past the forward end of the tube 19 is to draw in through the Venturi action which is thereby produced a relatively small supply of cool air. This cool air, of course, is immediately and uniformly distributed throughout the vortex as a direct result of the expansion which takes place when air under compression is released and helps in the further comminution of the material spray particles discharged from nozzle 21.

Into the center of the vortex of hot and rapidly expanding air described above the flowable liquid-containing materials are sprayed. This is accomplished through the use of a pump (not shown) which is connected to the material supply conduit 20. This pump forces the liquid-containing materials through the discharge nozzle 21 under considerable compression so as to cause a substantially conical spray of the liquid-containing material to be discharged at the center of the vortex. The discharge nozzle 21 is preferably of a type which will cause the liquid-containing material to be finely divided into a multiplicity of minute particles. As these minute particles of liquid-containing material are expelled into the center of the vortex they are drawn outwardly in conjunction with the expanding gases and thereby subjected to maximum impingement by molecules of hot dry air. The turbulent nature of the gases insures that each and every particle of the liquid-containing material will be brought into contact with a maximum number of hot air molecules. These particles are thus dried with substantially 100% efficiency. When dried they assume solid characteristics and the majority settle upon the bottom 12 of the drying chamber.

As this process continues to operate, the warm air is, of course, forced toward the outlet end of the drying chamber and comes in contact with the downwardly sloping ceiling and the adjustable steel curtain 34. These members direct the air downwardly so as to cause such dried particles as have not as yet settled to the bottom 12 to be brought into contact with the particles which have previously settled out of the air. It has been found that when a particle which is still moving through the air mass within the drying chamber comes into contact with particles which have already been deposited upon the bottom 12 the adhesion therebetween is sufficient to retain the previously moving particles in contact with those previously deposited. Thus most of the dried whey particles settle adjacent the rear wall 11 of the chamber and very few, if any, settle adjacent the front wall 10. The curtain 34 may be adjusted to increase or decrease as is found necessary the extent to which these particles are brought into the vicinity of the previously deposited material. As the relatively particle-free air moves beyond the curtain 34 it is carried through the exhaust duct 16 to a dust collector of the conventional type (not shown) where, if desired, the few remaining particles suspended in the air may be collected.

After the dried particles of the liquid-containing material have settled upon the bottom 12 sufficiently long to form a layer about one inch thick, they are removed at regular intervals by the drag element 22. I have found in the drying of flowable liquid-containing materials, that it is advantageous in drying the same to permit the accumulation of the dried product to continue for an interval, remaining undisturbed on the bottom of the drying chamber, and to thereafter withdraw it. Accordingly, at predetermined regular and relatively short intervals, the drag element 22 is promtly propelled from the upper end of the drying chamber toward the opening 31 in which is located the trough. As stated previously, I prefer to actuate or operate the drag element 22 about every five minutes. It is possible to shorten that interval but care must be exercised not to shorten this period below one minute for the particles should remain undisturbed at least that long for proper conversion into a stable state. I prefer to move the drag element 22 at such a speed that it requires 66–68 seconds to move from initial position to discharge position and back again to initial position. I then keep the drag element immobile until about four additional minutes have passed whereupon the drag element is again operated.

As the drag element moves forwardly the downwardly extending flanges 24 engage the deposited dried product and carry it along therewith and deposit it into the trough 31. The dried particles are piled, so to speak, against and around the trough 31. Thereafter the dried product is carried laterally by the auger type conveyor 32 into the elevator 33 which deposits the same wherever desired for eventual packaging, storage or shipment. As indicated above, the drag element 22 is thereafter caused by the drive roller 29 to move rearwardly to the upper end of the drying chamber and stopped for the short interval above mentioned (about four minutes).

As the drag element moves rearwardly the rockers 27 engage the bottom 12 of the drying chamber and cause the drag element 22 to move from the position shown in FIG. 4 to the feathered position shown in FIG. 5. When it is again moved forwardly after said interval, it is obvious that the lower flange 24 will again be brought down into contact with the dried product and will engage the same.

My apparatus is especially well adapted as described above for the drying of flowable liquid-containing materials. It provides a maximum mixing of the molecules of finely divided particles of the material with turbulent hot air to prevent the possible settling of these particles or their joinder with each other before they are dried. The outward flinging of these particles caused by the turbulent hot air in the aforementioned vortex insures an extremely rapid distribution of the particles throughout the chamber. At the same time it insures the impingement of these particles with a maximum number of molecules of hot air. My apparatus is capable and is especially well adapted for operation where it is necessary that the drying be performed under precisely controlled conditions. This is especially true with respect to control temperatures.

The utilization of a vortex of hot dry air in conjunction with the Venturi action is especially effective in the prevention of the formation of "dead spots" within the various portions of the drying chamber. I have found that unless such a means is used to insure a turbulent flow of air that "dead spots" will form within the drying chamber with the result that the drying operation within such areas is relatively ineffective. I have also found that if an ordinary flow of hot air without turbulence or vorticity is utilized, the Venturi action is not sufficient to reduce the pressure at the nozzle below atmosphere, and there is a tendency for a back flow of the dried particles of material into the interior of the exhaust sleeve **17*a* and no aspiration of cool air through the tube 19. This, of course, is extremely undesirable and is prevented with my apparatus through the utilization of the turbinating device 18** which forms the sufficiently high velocity vortex without increasing the rate of mass flow into the drying chamber to build up a back pressure therein.

I have found that in the production of dried materials such as herein described it is advantageous to permit the dried particles which settle upon the bottom 12 of the drying chamber to remain thereon for a short period of time before their removal in order to enable the formation of the monohydrate form of the dried particles adjacent the bottom and the absorption by them of only sufficient heat to complete a similar formation of the rest of the particles above them after removal. To accomplish this and to make the product uniform, I have utilized the drag elements 22 in conjunction with the cables 15 and the drive rollers 29 which are operated and stopped at predetermined regular intervals to insure that all of the material will be permitted to remain undisturbed upon the bottom 12 for at least the required short period of time (about one minute) and to insure that none of the material will remain thereon for too long a period of time. This interval timing is critical, because if too short, not all of it will reach the monohydrate form, which is the most stable nonhygroscopic form of the dried material.

My apparatus is especially well adapted to the drying of whey products and similar liquid-containing materials. It has been found that if whey is dried under optimum conditions the stable monohydrate form will be produced. This form is the desired form, since it is both stable and non-hygroscopic and consequently is not sticky. We have found that in the particular apparatus illustrated here, if we introduce hot air with a temperature in the neighborhood of 300° F. adjacent the air turbinating device 18 and if we adjust the curtain 34 so as to provide a temperature adjacent it in the neighborhood of 160° F. and a temperature adjacent the duct 16 in the neighborhood of 140° F. substantially all of the whey particles will assume a desired solid form. The rapid distribution of the particles of whey throughout the air chamber by the vortex of hot air is of particular importance in subjecting the various particles of whey to substantially the same conditions throughout the chamber. This insures a relatively uniform dried product, a characteristic highly desirable in any drying operation of whey. However, this solid form, though non-hygroscopic is unstable unless permitted to remain undisturbed for the required period of time and will revert back to the hygroscopic form which is a highly undesirable product.

It will, of course, be understood that various changes may be made in the form, details, arrangement and proportions of the various parts without departing from the scope of my invention.

What is claimed is:

1. The method of preparing stable non-hygroscopic dried whey comprising introducing into a hot drying chamber at an elevated position therewithin a very rapid flow of hot turbulent dry air having a high degree of vorticity and having a temperature above 140° F., spraying very well small particles of said whey into the central portion of said flow whereby said particles will be dried as they pass through the air and will all then be deposited in solid form upon the bottom of said drying chamber, permitting said dried particles deposited on the bottom wall to all remain stationary and undisturbed upon said floor in the hot drying chamber for about one to five minutes to permit the material in the whey particles to stabilize into non-hygroscopic condition before removing the same from the interior of the hot drying compartment, and removing said air from the hot drying chamber at an outflow temperature of about 140° F.

2. The method of preparing stable non-hygroscopic dried whey comprising introducing into a hot drying chamber a flow of hot turbulent dry air having a high degree of vorticity and at a temperature above 140° F., releasing at the center of said flow of dry air very small particles of whey whereby said particles will pass outwardly through the hot air and be dried and converted into a non-hygroscopic form as they pass through the hot air and settle upon the bottom of the drying chamber, removing the dried particles from the chamber at predetermined intervals of time only after having permitted all of them deposited on the bottom to rest undisturbed upon said bottom in the hot drying chamber for about one to five minutes to permit the material in the whey particles to stabilize into non-hygroscopic condition, and removing said air from the hot drying chamber at an outflow temperature of about 140° F.

3. The mehod of spray-drying whey wherein the dried whey is to be deposited upon the bottom of a hot drying chamber and removed therefrom with a conveyor having a cycle of movement of predetermined length, said method consisting in introducing at an elevated position into the drying chamber a flow of turbulent dry air at substantially 300° F. and having a high degree of vorticity, spraying very small particles of said whey into the central portion of said flow whereby said particles will be dried as they pass through the air and then deposited in solid form upon the bottom of said drying chamber, allowing said dried particles deposited on the bottom to all remain stationary in the lower part of the continuously accumulating layer upon said bottom in the hot drying chamber prior to removal therefrom by the conveyor a period of time exceeding one minute and preferably about five minutes but not substantially exceeding five minutes, and maintaining the air temperature above this layer at approximately 140° F.

4. The method of spray-drying whey wherein the whey is to be deposited upon the bottom of a hot drying chamber and removed therefrom with a conveyor having spaced conveying elements therein progressively movable lengthwise of the conveyor, said method consisting in introducing at an elevated position into the drying chamber a flow of hot turbulent dry air at a temperature above 140° F. and having a high degree of vorticity, spraying very small particles of only said whey into the central portion of said flow whereby said particles will be dried as they pass through the air and continuously accumulate in solid form upon the bottom of said hot drying chamber, and permitting at least the lower half of said accumulated layer of dried particles deposited on said bottom to all remain stationary upon said bottom in the hot drying chamber prior to removal of the entire layer therefrom by the conveyor a period of time exceeding one minute and preferably at least several minutes but not substantially exceeding five minutes to permit the material in the whey particles to stabilize into non-hygroscopic condition, and removing said air from the hot drying chamber at an outflow temperature of about 140° F.

5. The method of preparing stable non-hygroscopic dried whey comprising providing air in a hot drying chamber at a temperature above 140° F., introducing very small particles of only liquid whey into said chamber, drying said whey particles into solid form as they descend through the air in said chamber and deposit upon the bottom of said drying chamber, removing said dried whey particles from the floor of said chamber only after permitting all of the particles deposited on said bottom to remain stationary and undisturbed upon said bottom in the hot drying chamber for about five minutes to permit the material in the whey particles to stabilize into non-hygroscopic condition, and removing said air from the hot drying chamber at an outflow temperature of about 140° F.

6. The method of preparing stable non-hygroscopic dried whey consisting of introducing a flow of hot dry air at a temperature in excess of 140° F. in an elevated position into the interior of a hot drying chamber, spraying very small particles of only liquid whey into said flow of hot dry air to cause said particles to be dried into solid form and deposited upon the floor of the chamber, removing said dried whey particles from the floor of said chamber only after permitting all of the particles deposited upon said floor to remain in an undisturbed state upon said floor in the hot drying chamber for a period of about five minutes to permit the material in the whey particles to stabilize into non-hygroscopic condition, and removing said air from the hot drying chamber at an outflow temperature of 140° F.

7. The method of spray-drying whey comprising, confining and forming a vortex of heated air at a temperature in excess of 140° F., spraying only liquid whey in a fine particle spray into the center of said vortex, collecting the dried particles falling out from said vortex while keeping the temperature substantially constant, permitting the collected particles to all remain undisturbed for a period of about five minutes in the hot drying chamber to permit the material in the whey particles to stabilize into non-hygroscopic condition, disturbing and removing said particles only at the end of said period and removing said air from the hot drying chamber at an outflow temperature of about 140° F.

References Cited in the file of this patent

UNITED STATES PATENTS

| | | |
|---|---|---|
| 1,088,436 | Merrell | Feb. 24, 1914 |
| 1,537,060 | Beardslee | May 12, 1925 |
| 1,542,939 | Hopkinson | June 23, 1925 |
| 1,754,941 | Frohring et al. | Apr. 15, 1930 |
| 1,928,135 | Peebles et al. | Sept. 26, 1933 |
| 1,959,301 | Northcutt et al. | May 15, 1934 |
| 2,085,691 | Brown | June 29, 1937 |
| 2,110,167 | Northcutt et al. | Mar. 8, 1938 |
| 2,552,743 | Simpson | May 15, 1951 |
| 2,815,071 | Henszey | Dec. 3, 1957 |